United States Patent Office 3,360,543
Patented Dec. 26, 1967

3,360,543
REACTION PRODUCTS OF POLYCARBOXY POLYESTERS AND MONOCARBOXYLIC ACID ANHYDRIDES
Kenneth L. Hoy, St. Albans, W. Va., assignor to Union Carbide Corporation, a corporation of New York
No Drawing. Filed June 7, 1962, Ser. No. 200,661
26 Claims. (Cl. 260—475)

This invention relates to a novel class of organic chemical products which are useful in the plastics industry. More specifically, this invention relates to a new class of products which are reaction products of a polycarboxy polyester and an anhydride of an aliphatic, monocarboxylic acid.

The polycarboxy polyester-monocarboxylic acid anhydride reaction products of this invention are carboxy terminated and also contain, in the same molecule, anhydride groups

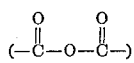

and ester groups.

The novel reaction products of this invention are useful in a wide variety of applications in the plastics industry, as for example, as molding, casting, coating, laminating and adhesive compositions. These reaction products can be used in virtually any application wherein products having anhydride and/or carboxy moieties are required or desired. The reaction products of this invention are especially useful as curing agents for polyepoxides which contain an average of more than one epoxy group per molecule, wherein the oxygen atom is attached to vicinal carbon atoms, i.e.,

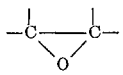

The reaction products of this invention, formed on reacting a polycarboxy polyester with an anhydride of an aliphatic, monocarboxylic acid, are generally liquids at room temperature, about 25° C.; or solids which will melt at temperatures below about 110° C. and when subsequently cooled to about room temperature remain as super-cooled liquids for extended periods of time. By virtue of their liquid nature, as defined, these reaction products are easily and readily admixed with polyepoxides at temperatures between about room temperature and about 110° C. to provide homogeneous mixtures which show no appreciable gelation and which remain homogeneous and fluid at room temperature (after cooling to about room temperature if a higher admixing temperature has been used), for relatively long periods of time. Upon heating these polyepoxide compositions, however, to temperatures generally on the order of about 115° C. to about 250° C. and preferably to temperatures on the order of about 125° C. to about 180° C., they will cure to hard, infusible products. The length of time of the curing cycle will depend, of course, upon the temperatures employed as well as the composition which is being cured. The cured products of this invention are generally harder than are those cured products obtained from polyepoxide compositions containing the corresponding polycarboxy polyester as the curing agent and consequently are extremely scratch and mar resistant.

As stated, the reaction products of this invention are prepared by the reaction of a polycarboxy polyester and an anhydride of an aliphatic monocarboxylic acid, wherein the resultant product has within each molecule terminal carboxy groups (COOH), anhydride groups

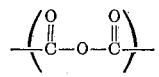

and ester groups.

The overall process by which the reaction products of the present invention are prepared can be represented by the following exemplary equations:

(1)
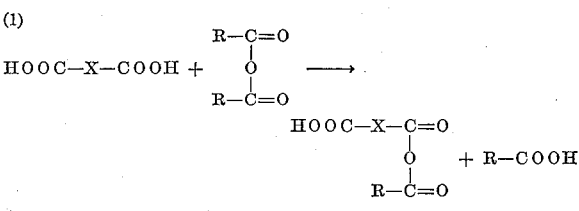

(2)
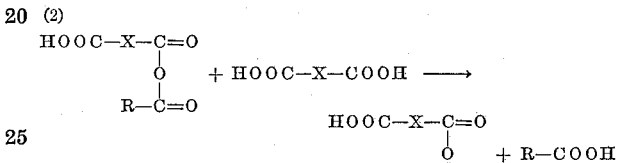

(3)
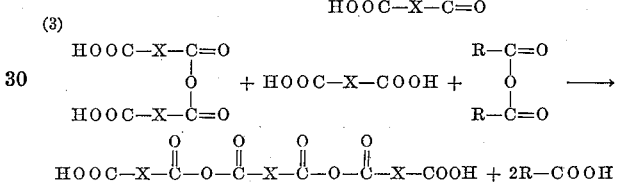

In each of Equations 1 or 3, R represents an aliphatic, monovalent hydrocarbon radical, generally containing one to ten carbon atoms inclusive and preferably containing from one to six carbon atoms inclusive and each X represents the ester portion of the polycarboxy polyester starting material.

In the event that unreacted polycarboxy polyester and anhydride of an aliphatic monocarboxylic acid remain in the reaction mass, the reaction product of Equation 3 will further react therewith to produce a final reaction product having more than two anhydride groups per molecule. This final reaction product can be conveniently represented by the formula:

(A)
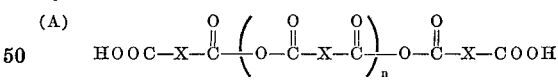

wherein $n$ is a whole number having a value of greater than one.

While the above Formula A is representative of a reaction product wherein a dicarboxy polyester is used as an initial reactant, this reactant represented by the formula:

(B)         HOOC—X—COOH tricarboxy polyesters represented by the formula:

(C)

and tetracarboxy polyesters represented by the formula:

(D)
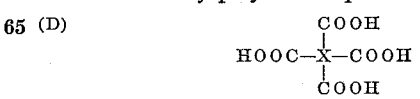

can be used as initial reactants, wherein each X in Formulas B, C and D is as previously defined.

When the initial polycarboxy polyester is a tricarboxy polyester (Formula C), the resultant reaction product can be represented by the formula:

(E) 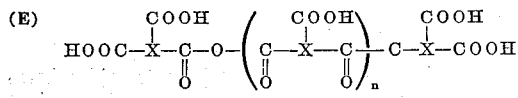

wherein X and n are as defined previously.

When the initial polycarboxy polyester reactant is a tetracarboxy polyester (Formula D), the resultant reaction product can be represented by the formula:

(F) 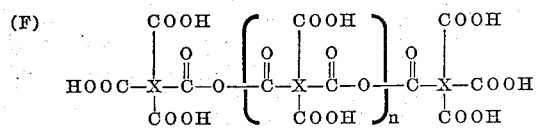

wherein X and n are as defined previously.

The degree of condensation with respect to the reaction product is dependent upon the ratio of the number of anhydride groups,

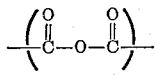

to the number of carboxy groups, (COOH), present in the reaction mixture prior to the commencement of the condensation reaction. It is thus possible to control the molecular weight of the reaction product by varying this ratio. Determination of this charge ratio (Rc), under ideal conditions, can be made through the use of the equation:

$$Rc = \frac{n+1}{f(n+2)} = \frac{\rho - 1}{\rho f}$$

wherein $Rc$ is the ratio of anhydride groups to carboxy groups in the initial charge, $f$ is the functionality of the polycarboxy polyester in the initial charge and is equal to the number of carboxy groups per molecule of polycarboxy polyester, $\rho$ is the number of monomer units in the reaction product and is equal to $n+2$ and $n$ has been previously defined.

The ratio of anhydride groups to carboxy groups in the reaction product (Rp), can be determined through use of the equation:

(5) $$Rp = \frac{n+1}{n(f-2) + 2(f-1)}$$

wherein $n$ and $f$ have been previously defined.

The limiting value of the ratio of anhydride groups to carboxy group in the initial charge is determined through use of the equation:

(6) $$Rc = \frac{1}{f}$$

wherein $f$ has been previously defined.

The molecular weight (MW) of the reaction product is determined through use of the equation:

$$MW = n(M - 18) + (2M - 18)$$

wherein $n$ is as defined and $M$ is molecular weight of the polycarboxy polyester.

Through the use of the foregoing formulas, the initial charge ratio can be determined as well as the molecular weight of the reaction product. While, as stated, these determinations are for ideal conditions, the values obtained furnish workable data.

For purposes of this invention, particularly desirable reaction products are obtained by using initial reactants in amounts such that the charge ratio Rc is as follows:

| Polycarboxy Polyester | Operable | Preferred |
| --- | --- | --- |
| Dicarboxy | 0.100 to 0.500 | 0.120 to 0.250. |
| Tricarboxy | 0.100 to 0.333 | 0.150 to 0.240. |
| Tetracarboxy | 0.100 to 0.250 | 0.175 to 0.200. |

Products produced employing reactants in amounts such that the charge ratios are as indicated can be very readily admixed with polyperoxides to form blends which can be subsequently cured to infusible products having excellent physical properties.

The polycarboxy polyester starting materials used in preparing the reaction products of this invention can be prepared by methods known in the art, by reacting an excess polycarboxylic acid or polycarboxylic acid anhydride with a polyhydric alcohol. An excess of polycarboxylic acid is used in order to form polyesters with terminal carboxy groups.

Illustrative of the polycarboxylic acids which can be used in the preparation of the polycarboxy polyesters are the dibasic acids such as those having the formula:

$$HOOC-(CH_2)_a COOH$$

wherein $a$ is an integer generally having a value of 0 to 15 inclusive, and preferably having a value of 0 to 10 inclusive exemplary of which are oxalic acid, malonic acid, succinic acid, glutaric acid, adipic acid, pimelic acid, suberic acid, azelaic acid, sebacic acid and the like; dibasic unsaturated acids, such as those having the formula:

$$HOOC-(C_zH_{2z-2})COOH$$

wherein $z$ is an integer generally having a value of 2 to 10 inclusive and preferably having a value of 2 to 4 inclusive, exemplary of which are fumaric acid, maleic acid, glutaconic acid, citraconic acid, itaconic acid, mesaconic acid, allylmalonic acid, propylidenemalonic acid, hydromuconic acid and the like; the aromatic dibasic acids such as phthalic acid, isophthalic acid, terephthalic acid and the like; tribasic acids such as 1,1,5-pentanetricarboxylic acid, 1,2,4-hexanetricarboxylic acid, 2-n-propyl-1,2,4-pentanetricarboxylic acid, 5-octane-3,3,6-tricarboxylic acid, 1,2,3-propanetricarboxylic acid, 1,2,4-benzenetricarboxylic acid and the like; tetrabasic acids such as pyromellitic acid, 1,2,4,5-benzenetetracarboxylic acid and the like; other suitable polybasic acids include benzenepentacarboxylic acid, mellitic acid and the like.

It is to be understood that anhydrides of the acids noted above are illustrative of anhydrides which can be used as reactants in the preparation of the polycarboxy polyesters.

Typical polyhydric compounds which can be reacted with any of the above-noted polycarboxylic acids or anhydrides thereof to form the polycarboxy polyesters of this invention include, among others, compounds having the formula:

$$HO(C_bH_{2b}O)_d H$$

wherein $b$ is an integer, generally having a value of 2 to 6 inclusive, preferably having a value of 2 to 4 inclusive and $d$ is an integer, generally having a value of 1 to 8 inclusive and preferably having a value of 1 to 4 inclusive. Illustrative of such polyhydric compounds are the following: ethylene glycol, diethylene glycol, triethylene glycol, tetraethylene glycol, 1,2-propylene glycol, 1,3-propylene glycol, dipropylene glycol, tripropylene glycol, 1,2-butylene glycol, 1,4-butylene glycol, 1,5-pentamethylene glycol, 1,6-hexamethylene glycol, 3-methyl-1,5-pentanediol, 2-methyl-2,5-pentanediol, 3-methyl-2,5-pentanediol and the like. Other suitable polyhydric compounds are the following: glycerol, 1,2,6-hexanetriol, 1,1,1-trimethylol propane, trimethylol methane, pentaerythritol, dipentaerythritol, diglycerol, pentaglycerol, sorbitol, mannitol, polyvinyl alcohol and the like.

The ratio of reactants, that is the polyhydroxy compound and the polycarboxylic acid and/or anhydride thereof are such as to provide a polycarboxy polyester which has terminal carboxy groups. Suitable polycarboxy polyesters can be prepared using the reactants in the following mole ratios:

| Polyhydric Compound | Mole Ratio of Polycarboxylic Acid or Anhydride Thereof to Polyhydric Compound | |
|---|---|---|
| | Operable | Preferred |
| Dihydric | 1.1 to 2.0 to one | 1.5 to 2.0 to one. |
| Trihydric | 2.2 to 3.0 to one | 2.5 to 3.0 to one. |
| Tetrahydric | 3.3 to 4.0 to one | 3.5 to 4.0 to one. |

Preparation of polycarboxy polyesters is conducted by admixing the desired polycarboxylic acid and/or anhydride thereof with the desired polyhydric compound in amounts such that the materials react to form carboxy terminated polycarboxy polyesters. The temperature at which this reaction is conducted can vary from about 100° C. to about 175° C. As a rule the time of reaction varies from about 2 to about 6 hours. A detailed description of the preparation of suitable polycarboxy polyesters is to be found subsequently in this specification.

It is to be understood that mixtures of acids, of anhydrides thereof and of polyhydric compounds can be reacted, if so desired.

Illustrative of anhydrides of aliphatic monocarboxylic acids which are reacted with polycarboxy polyesters are those which have the formula:

wherein R is an aliphatic, monovalent hydrocarbon radical, generally having 1 to 10 carbon atoms inclusive and preferably having 1 to 6 carbon atoms inclusive. The most preferred anhydride is acetic acid anhydride because of its ready availability and low cost. Exemplary of other suitable anhydrides are: propionic acid anhydride, n-butyric acid anhydride, n-valeric acid anhydride, trimethylacetic acid anhydride, caproic acid anhydride, caprylic acid anhydride, n-heptylic acid anhydride, haloacetic acid anhydrides as for example, mono-, di-, and trichloroacetic anhydride, acrylic acid anhydride, methacrylic acid anhydride, crotonic acid anhydride, isocrotonic acid anhydride, vinylacetic acid anhydride, tiglic acid anhydride, angelic acid anhydride, senecioic acid anhydride, hexenoic acid anhydride and the like.

The reaction between the polycarboxy polyesters and the anhydrides of aliphatic monocarboxylic acids is conducted by admixing the two reactants and heating the mixture at a temperature of about 110° C. to about 200° C. and preferably at a temperature of about 110° C. to about 150° C. In conducting this reaction, the reactants are preferably reacted in toluene. The toluene forms a constant boiling mixture with unreacted acid which remains in the reaction mixture. This constant boiling mixture is easily removed by distillation leaving behind the desired reaction product. Preparation of reaction products of this invention is further described in Example 1 of this specification. It is to be understood that mixtures of polycarboxy polyesters and/or anhydrides of aliphatic monocarboxylic acids can be used if so desired.

As previously stated, the reaction products of this invention will cure polyepoxides to infusible products. Various amounts of the reaction products can be used to cure polyepoxides. Generally, the reaction products of this invention and the polyepoxides are admixed in amounts such as to provide about 0.1 to about 2 carboxy groups per each epoxy group, and preferably about 0.3 to about 1 carboxy group per each epoxy group. In determining the number of carboxy groups in the reaction products of this invention, the anhydride moieties are considered as 2 carboxy groups.

The curing reaction involving the reaction products and the polyepoxides occurs when the desired polyepoxide and reaction product are admixed and the mixture heated at a temperature of about 115° C. to about 250° C. and preferably at a temperature of about 125° C. to about 180° C. The actual temperature used and the length of time of the curing cycle will depend upon the polyepoxide which is being cured to an infusible product as well as the actual reaction product, of this invention, employed.

The polyepoxides which can be cured with the reaction products of this invention are those organic compounds having an oxirane epoxy equivalency of more than one, that is, compounds having an average of more than one epoxy group, i.e.,

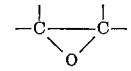

per molecule. These compounds wherein the oxygen of the epoxy group is attached to vicinal carbon atoms can be saturated or unsaturated, aliphatic, cycloaliphatic, or heterocyclic, and can be substituted, with substituents such as halogen atoms, hydroxyl groups, ether groups, and the like.

Illustrative of polyepoxides which can be cured with the reaction products of this invention are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. Patent 2,506,486 and polyphenylols such as the novolak condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. Patent 2,885,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al., U.S. Patent 2,506,486). The polyhydric polynuclear phenols can consist of two or more phenols connected by such groups as methylene, alkylene, or sulfone. The connecting groups are further exemplified by bis(4-hydroxyphenyl)methane, 2,2-bis(p-hydroxyphenyl)propane, and dihydroxydiphenyl sulfone.

Process for the preparation of polyglycidyl ethers of polyhydric phenols is described in detail in the Bender et al. patent supra and U.S. Patent 2,801,989 to A. G. Farnham. Among the more common polyglycidyl ethers of polyhydric phenols are polyglycidyl ether of 2,2-bis(p-hydroxyphenyl)propane and polyglycidyl ether of bis(p-hydroxyphenyl)methane. Other suitable polyglycidyl ethers of polyhydric phenols are enumerated in U.S. Patent 2,633,458.

Also suitable are the polyglycidyl ethers of polyhydric alcohols, such as the reaction products of epichlorohydrin and polyhydric alcohols, for example aliphatic compounds containing from two to four alcoholic hydroxyl groups, such as ethylene glycol, propane diols, butane diols, glycerine, hexane triols, and the like. (Methods of preparing polyglycidyl ethers of polyhydric alcohols are described in U.S. Patent 2,898,349 to P. Zuppinger et al.).

Other suitable polyglycidyl compounds are the polyglycidyl esters of polycarboxylic acids, such as the polyglycidyl esters of adipic acid, phthalic acid, and the like. Polyglycidyl esters of polycarboxylic acids are described in detail in U.S. Patent 2,870,170 to Payne et al. Also suitable are polyglycidyl compounds produced by reacting epichlorohydrin with aromatic amines, such as aniline, 2,6-dimethylaniline, p-toluidine, m-chloroaniline, p-aminodiphenyl, m-phenylenediamine, p-phenylenediamine, 4,4'-diaminodiphenylmethane, or with amino phenols such as p-aminophenol, 4-amino-1-naphthol, 4-aminoresorcinol, 2-methyl-4-aminophenol, 2-chloro-4-aminophenol, and the like. Specific compounds include, among others, N,N-diglycidylaniline, N,N-diglycidyl-2,6-dimethylaniline, N,N,N',N'-tetraglycidyl-4,4'-diaminodiphenylmethane, the triglycidyl derivative of p-amino phenol wherein the aminohydrogen and OH hydrogen atoms are replaced by glycidyl groups. Polyglycidyl derivatives of aromatic amines and amino phenols and methods for their preparation are further described in U.S. Patent Nos. 2,951,625 and 2,951,822 to N. H. Reinking and N. H. Reinking et al., respectively. The so-called peracetic acid epoxides which are obtained by epoxidation across a double bond using peracetic acid, such as bis(2,3-epoxycyclopentyl)ether, vinylcyclohexane dioxide, 3,4-epoxy-6-methylcyclohexylmethyl 3,4-epoxy-6-methylcyclohexanecarboxylate are also suitable.

It is to be understood that the disclosure of all patents and literature references referred to in this specification are incorporated herein by reference.

A number of polycarboxy polyesters were prepared and subsequently reacted with anhydrides of aliphatic monocarboxylic acids to produce the reaction products of the present invention. The materials reacted, the amount of each material used, and the nature of the polycarboxy polyester produced are noted in Table 1 below. In each case the reactants were placed in a 3-necked flask fitted with a Dean-Stark column, a mechanical stirrer and a gas inlet tube for flushing the flask with dry nitrogen. The reaction mixture was heated to a temperature in the range of 130° C. to 140° C. whereupon the mixture became homogeneous. The reaction became exothermic and the temperature of the reaction mixture rose to between about 175° C. to about 180° C. The reaction mixture was stirred and maintained within this latter temperature range for about 1.5 to 2 hours. The reaction mixture was then cooled to room temperature and the polycarboxy polyester, which was carboxy terminated, recovered.

in a 3-necked, round bottom flask fitted with a mechanical stirrer, dropping funnel and a 15 centimeter column packed with glass helices, to which column was attached a variable take-off distillation head. The mixture was heated to reflux and a calculated amount of acetic anhydride was added dropwise with stirring in a period of about 0.5 hour. The acetic acid formed as a by-product of the reaction was removed by distillation of its azeotrope with toluene at about 105° C. After about an hour, the temperature of the reaction mixture rose to between 175° C. and 190° C. and the last traces of toluene and acetic acid were removed by flushing the apparatus with dry nitrogen gas. The reaction product was then cooled, removed from the flask and analyzed to determine its carboxy and anhydride content.

| Reaction Product | Ratio of Anhydride Groups to Carboxy Groups [1] | Analysis of Reaction Product | | |
|---|---|---|---|---|
| | | Anhydride Groups [2] | Carboxy Groups [2] | Description |
| A | 0.058 to 1 | 0.354 | 6.39 | Liquid at 25° C. |
| B | 0.117 to 1 | 0.515 | 5.09 | Do. |
| C | 0.167 to 1 | 0.660 | 6.21 | Do. |
| D | 0.250 to 1 | 0.900 | 6.05 | Do. |
| E | 0.293 to 1 | | | Solid having a melting point of 50–60° C. |

[1] Ratio of anhydride groups to carboxy groups based on initial reactants (Rc).
[2] In milliequivalents per gram of reaction product.

EXAMPLE 2

This example illustrates the preparation of reaction products of polycarboxy polyesters using polycarboxy polyester No. 2 of Table 1 and acetic anhydride.

The procedure used to prepare the reaction products of this example was the same as described in Example 1.

TABLE 1

| Polyhydroxy Compound | Parts by Weight of Polyhydroxy Compound | Polycarboxylic Compound | Parts by Weight of Polycarboxylic Compound | Polycarboxy Polyester | | |
|---|---|---|---|---|---|---|
| | | | | Color and Description | Melting Point, °C. | Neutral Equivalent |
| 1-glycerol | 92 | Succinic anhydride | 305 | Gray, solid | 90–110 | 124 |
| 2-ethylene glycol | 124 | do | 405 | White, solid | 75–120 | 123.5 |
| 3-pentaerythritol | 136 | do | 405 | do | 100–145 | 135 |
| 4-3-methyl-1,5-pentanediol | 118 | do | 200 | Gray, solid | 100–120 | 154 |
| 5-1,2,6-hexanetriol | 201 | do | 450 | Amber, solid | 80–100 | 143 |
| 6-glycerol | 92 | Maleic anhydride | 299 | Yellow, solid | 70–80 | 138 |
| 7-p-dimethylolbenzene | 27 | Succinic anhydride | 42 | Tan, solid | 80–110 | 175 |
| 8-ethylene glycol | 62 | Phthalic anhydride | 296 | do | 100–130 | 172 |
| 9-ethylene glycol | 31 | Maleic anhydride | 93 | | | 163 |
| 10-trimethylolethane | 180 | Succinic anhydride | 450 | | 70–85 | 138 |

The following examples further illustrate the present invention and are not intended to limit the scope thereof in any manner.

EXAMPLE 1

This example illustrates the preparation of reaction products of polycarboxy polyesters and anhydrides of aliphatic, monocarboxylic acids.

Using polycarboxy polyester No. 1, noted in Table 1, various reaction products were produced by reacting various amounts of this polycarboxy polyester with acetic anhydride. In each instance, the reaction product was prepared by suspending 124 parts by weight of the polycarboxy polyester in 100 parts by weight toluene, contained

| Reaction Product | Ratio of Anhydride Groups to Carboxy Groups Based on Initial Reactants (Rc) | Viscosity of Reaction Product in Poises at 27° C. Using a Brookfield Viscosimeter |
|---|---|---|
| F | 0.250 to 1 | 345 |
| G | 0.333 to 1 | 279 |
| H | 0.375 to 1 | 575 |
| I | 0.400 to 1 | 378 |

EXAMPLE 3

This example illustrates the preparation of reaction products of polycarboxy polyesters, using various polycarboxy polyesters, and acetic anhydride.

The procedure used to prepare the reaction products of this example was the same as described in Example 1.

| Reaction Product | Polycarboxy Polyester (Described in Table 1) | Parts by Weight of Polycarboxy Polyester | Parts by Weight of Acetic Anhydride | Ratio of Anhydride Groups to Carboxy Groups Based on Initial Reactants (Rc) | Analysis of Reaction Product | |
|---|---|---|---|---|---|---|
| | | | | | Melting Point Range, ° C. | Description at 25° C. |
| J | 3 | 56 | 6 | 0.140 to 1 | 50–60 | Glassy solid. |
| K | 4 | 77 | 12.75 | 0.250 to 1 | | Liquid. |
| L | 5 | 638 | 75 | 0.164 to 1 | | Viscous liquid. |
| M | 6 | 138 | 17 | 0.166 to 1 | 25–45 | Glassy solid. |
| N | 7 | 68.7 | 114 | 0.224 to 1 | 40–60 | Do. |
| O | 8 | 64 | 8 | 0.214 to 1 | 80–90 | Waxy solid. |
| P | 9 | 100 | 15.7 | 0.264 to 1 | 90–100 | Crystalline solid. |
| Q | 10 | 60 | 9.5 | 0.255 to 1 | | Yellow liquid. |

EXAMPLE 4

A number of curable polyepoxide compositions were prepared by admixing a polyepoxide with various reaction products of polycarboxy polyesters and anhydrides of aliphatic, monocarboxylic acids. Amount of reactants used in each instance were such as to provide one carboxy group per each epoxy group.

The reactants were mixed to a blend and then cured to infusible products. The polyepoxides, the reaction products (reaction product of a polycarboxy polyester and an anhydride of an aliphatic, monocarboxylic acid), temperature at which the polyepoxide composition was formulated to a blend, the curing cycle of the polyepoxide composition and the description of the cured product are noted in the table which follows.

| Composition | Polyepoxide | Reaction Product (Example 3) | Temperature at Which Composition Was Blended, ° C. | Curing Cycle | Description of Cured Product |
|---|---|---|---|---|---|
| (a) | 3,4-epoxy-6-methylcyclohexyl-methyl 3,4-epoxy-6-methyl-cyclohexanecarboxylate. | (K) | 26 | 12 hours at 120° C., 6 hours at 160° C. | Tough, amber colored. |
| (b) | Same as (a) | (Q) | 26 | 6.5 hours at 120° C., 6 hours at 160° C. | Tough, yellow colored. |
| (c) | do | (N) | 26 | do | Tough, amber colored. |
| (d) | do | (O) | 26 | do | Tough, yellow colored; Barcol, 30. |
| (e) | do | (P) | 44 | 4 hours at 120° C., 6 hours at 160° C. | Tough, yellow colored; Barcol, 28. |
| (f) | Diglycidylether of 2,2-bis-(p-hydroxyphenyl)propane. | (P) | 30 | 7 hours at 120° C., 6 hours at 160° C. | Tough, yellow colored; Barcol, 32. |
| (g) | Vinylcyclohexane dioxide | (P) | 57 | 4 hours at 120° C., 6 hours at 160° C. | Tough, yellow colored. |
| (h) | Bis-(2,3-epoxycyclopentyl)ether | (P) | 55 | 6 hours at 120° C., 6 hours at 160° C. | Tough, yellow colored; Barcol, 32. |

In each instance no gelation occurred during the blending operation.

Barcol Hardness values were determined using a Barcol impressor GYZJ934–1.

It has been demonstrated that the reaction products of this invention are readily admixed with polyepoxides to form blends at relatively low temperatures, thereby eliminating undesirable premature reaction between the reaction product curing agent and the polyepoxide. For purposes of comparison, polyepoxide compositions were prepared using 3,4-epoxy-6-methyl-cyclohexanecarboxylate and various conventional curing agents. The curing agents used and the temperatures required in order to effect a blend of a polyepoxide therewith are summarized below. In each instance amounts used were such as to provide one carboxy group per epoxy group.

Curing agent: Temperature at which composition had to be heated in order to form a blend, ° C.
- Phthalic anhydride _____ [1] 110
- Succinic anhydride _____ [1] 120
- Phthalic acid, composition gelled at _____ 110
- Succinic acid, composition gelled at _____ 110

[1] Some gelation occurred.

What is claimed is:

1. A reaction product of (1) a carboxy terminated polycarboxy polyester and (2) an anhydride of an aliphatic monocarboxylic acid having the formula:

wherein R is an aliphatic monovalent hydrocarbon radical; said polycarboxy polyester being produced by reaction of at least one polyol, containing 2 to about 4 hydroxyl groups, with an excess of at least one member selected from the group consisting of aliphatic hydrocarbon polycarboxylic acids, aliphatic hydrocarbon polycarboxylic acid anhydrides, aromatic hydrocarbon polycarboxylic acids, and aromatic hydrocarbon polycarboxylic acid anhydrides; said reaction product being carboxy terminated and containing within the same molecule anhydride groups and ester groups.

2. A reaction product as defined in claim 1 wherein R contains 1 to 10 carbon atoms inclusive.

3. A reaction product as defined in claim 1 wherein R contains 1 to 6 carbon atoms inclusive.

4. A reaction product as defined in claim 1 wherein the said polycarboxy polyester is formed from glycerol and succinic anhydride.

5. A reaction product as defined in claim 1 wherein said polycarboxy polyester is formed from ethylene glycol and succinic anhydride.

6. A reaction product as defined in claim 1 wherein the said polycarboxy polyester is formed from pentaerythritol and succinic anhydride.

7. A reaction product as defined in claim 1 wherein said polycarboxy polyester is formed from 3-methyl-1,5-pentanediol and succinic anhydride.

8. A reaction product as defined in claim 1 wherein the said polycarboxy polyester is formed from 1,2,6-hexanetriol and succinic anhydride.

9. A reaction product as defined in claim 1 wherein the said polycarboxy polyester is formed from glycerol and maleic anhydride.

10. A reaction product as defined in claim 1 wherein the said polycarboxy polyester is formed from p-dimethylolbenzene and succinic anhydride.

11. A reaction product as defined in claim 1 wherein the said polycarboxy polyester is formed from ethylene glycol and phthalic anhydride.

12. A reaction product as defined in claim 1 wherein the said polycarboxy polyester is formed from ethylene glycol and maleic anhydride.

13. A reaction product as defined in claim 1 wherein the said polycarboxy polyester is formed from trimethylol ethane and succinic anhydride.

14. A reaction product as defined in claim 1 wherein said anhydride of an aliphatic, monocarboxylic acid is acetic anhydride.

15. A reaction product as defined in claim 1 wherein said polycarboxy polyester is formed from glycerol and succinic anhydride and said anhydride of an aliphatic, monocarboxylic acid is acetic anhydride.

16. A reaction product as defined in claim 1 wherein the said polycarboxy polyester is formed from ethylene glycol and succinic anhydride and said anhydride of an aliphatic, monocarboxylic acid is acetic anhydride.

17. A reaction product as defined in claim 1 wherein the said polycarboxy polyester is formed from pentaerythritol and succinic anhydride and said anhydride of an aliphatic, monocarboxylic acid is acetic anhydride.

18. A reaction product as defined in claim 1 wherein the said polycarboxy polyester is formed from 3-methyl-1,5-pentanediol and succinic anhydride and said anhydride of an aliphatic, monocarboxylic acid is acetic anhydride.

19. A reaction product as defined in claim 1 wherein the said polycarboxy polyester is formed from 1,2,6-hexanetriol and succinic anhydride and said anhydride of an aliphatic, monocarboxylic acid is acetic anhydride.

20. A reaction product as defined in claim 1 wherein the said polycarboxy polyester is formed from glycerol and maleic anhydride and said anhydride of an aliphatic, monocarboxylic acid is acetic anhydride.

21. A reaction product as defined in claim 1 wherein the said polycarboxy polyester is formed from p-dimethylolbenzene and succinic anhydride and said anhydride of an aliphatic, monocarboxylic acid is acetic anhydride.

22. A reaction product as defined in claim 1 wherein said polycarboxy polyester is formed from ethylene glycol and phthalic anhydride and said anhydride of an aliphatic, monocarboxylic acid is acetic anhydride.

23. A reaction product as defined in claim 1 wherein said polycarboxy polyester is formed from ethylene glycol and maleic anhydride and said anhydride of an aliphatic, monocarboxylic acid is acetic anhydride.

24. A reaction product as defined in claim 1 wherein said polycarboxy polyester is formed from trimethylol ethane and succinic anhydride and said anhydride of an aliphatic, monocarboxylic acid is acetic anhydride.

25. A reaction product as defined in claim 2 wherein said polycarboxy polyester is produced by reaction of at least one polyol, containing 2 to 4 hydroxyl groups, with an excess of at least one member selected from the group consisting of dibasic acids having the formula:

$$HOOC-(CH_2)_a-COOH$$

where $a$ is an integer having a value of 0 to 15, and the anhydrides thereof.

26. A reaction product as defined in claim 2 wherein said polycarboxy polyester is produced by reaction of at least one polyol, containing 2 to 4 hydroxyl groups, with an excess of at least one member selected from the group consisting of dibasic acids having the formula:

$$HOOC-(C_zH_{2z-2})-COOH$$

where $z$ is an integer having a value of 2 to 10, and the anhydrides thereof.

References Cited

UNITED STATES PATENTS

| | | | |
|---|---|---|---|
| 2,028,908 | 1/1936 | Hoffman | 260—76 |
| 2,764,597 | 9/1956 | Barney | 260—346.3 |
| 2,996,520 | 8/1961 | Knobloch et al. | 260—346.3 |
| 2,324,483 | 7/1943 | Castan | 260—47 |
| 2,935,488 | 5/1960 | Phillips et al. | 260—45.4 |

LORRAINE A. WEINBERGER, *Primary Examiner.*

WILLIAM H. SHORT, RICHARD K. JACKSON,
*Examiners.*

T. D. KERWIN, T. L. GALLOWAY,
*Assistant Examiners.*